(12) United States Patent
Carver et al.

(10) Patent No.: US 10,045,520 B2
(45) Date of Patent: Aug. 14, 2018

(54) APPARATUS FOR INDICATING PEST ACTIVITY

(71) Applicant: RENTOKIL INITIAL PLC, Blackwater, Camberley Surrey (GB)

(72) Inventors: Andrew Carver, Camberley Surrey (GB); Matthew Green, Camberley Surrey (GB)

(73) Assignee: RENTOKIL INITIAL PLC, Camberley (GB)

( * ) Notice: Subject to any disclaimer, the term of this patent is extended or adjusted under 35 U.S.C. 154(b) by 0 days.

(21) Appl. No.: 15/127,608

(22) PCT Filed: Feb. 24, 2015

(86) PCT No.: PCT/GB2015/050527
§ 371 (c)(1),
(2) Date: Sep. 20, 2016

(87) PCT Pub. No.: WO2015/140497
PCT Pub. Date: Sep. 24, 2015

(65) Prior Publication Data
US 2017/0142953 A1    May 25, 2017

(30) Foreign Application Priority Data
Mar. 20, 2014 (GB) .................................. 1404996.9

(51) Int. Cl.
*G08B 21/00* (2006.01)
*A01M 1/02* (2006.01)
(Continued)

(52) U.S. Cl.
CPC ............ *A01M 1/026* (2013.01); *A01M 1/103* (2013.01); *G08B 21/18* (2013.01)

(58) Field of Classification Search
CPC ........ A01N 51/00; A01N 41/06; A01N 43/22; A01N 43/54; A01N 47/02; A01N 47/34;
(Continued)

(56) References Cited

U.S. PATENT DOCUMENTS

| 5,815,090 A | 9/1998 | Su |
| 2004/0140900 A1* | 7/2004 | Barber .................. A01M 1/026 |
| | | 340/573.2 |

(Continued)

FOREIGN PATENT DOCUMENTS

| GB | 2463953 A | 4/2010 |
| JP | 7-123894 A | 5/1995 |

OTHER PUBLICATIONS

International Search Report dated May 21, 2015 from International Patent Application No. PCT/GB2015/050527, 6 pages.
(Continued)

*Primary Examiner* — Daniel Previl
(74) *Attorney, Agent, or Firm* — Ohlandt, Greeley, Ruggiero & Perle, L.L.P.

(57) ABSTRACT

The present disclosure provides an apparatus for indicating pest activity that includes an activity indicator and an activity sensor. The activity sensor includes a substrate that is a material attractive to a target pest species, and a sensing element formed on and/or within the substrate. The sensing element is couplable to a power source and the activity indicator, and outputs a signal to the activity indicator. The signal is influenced by pest activity on and/or within the substrate, and the activity indicator indicates a state of the signal received from the sensing element. The state of the signal changes responsive to deposit of a pest excretion on the sensing element. The present disclosure also provides a pest activity reporting system incorporating the apparatus that conveys a state of the signal to a remote location. The
(Continued)

present disclosure also provides an activity sensor for use in the apparatus.

27 Claims, 4 Drawing Sheets

(51) Int. Cl.
*A01M 1/10* (2006.01)
*G08B 21/18* (2006.01)

(58) Field of Classification Search
CPC ...... A01N 57/16; A01N 25/006; A01N 25/16; A01N 25/22; A01M 1/026; A01M 1/2011; A01M 31/002; A01M 1/24; A01M 2200/011
USPC .............. 340/664, 573.1, 573.2, 10.1, 539.1, 340/662–663, 686.6, 691.6, 693.1, 384.2
See application file for complete search history.

(56) References Cited

U.S. PATENT DOCUMENTS

| | | | |
|---|---|---|---|
| 2008/0204252 A1* | 8/2008 | Tolley | A01M 1/026 340/573.2 |
| 2009/0192763 A1 | 7/2009 | Gardner, Jr. et al. | |
| 2010/0043276 A1* | 2/2010 | Eger, Jr. | A01M 1/026 43/131 |
| 2010/0134301 A1* | 6/2010 | Borth | A01M 1/026 340/573.2 |
| 2012/0012046 A1* | 1/2012 | Cain | A01M 1/026 116/200 |
| 2012/0299731 A1* | 11/2012 | Triener | G01G 17/08 340/573.1 |
| 2014/0123543 A1* | 5/2014 | Osseiran | A01M 1/026 43/131 |

OTHER PUBLICATIONS

Written Opinion dated May 21, 2015 from International Patent Application No. PCT/GB2015/050527, 6 pages.

* cited by examiner

APPARATUS FOR INDICATING PEST ACTIVITY

CROSS-REFERENCE TO RELATED APPLICATIONS

The present application is a national stage application of PCT Patent Application No. PCT/GB2015/050527, filed Feb. 24, 2015, which claims priority to UK Patent Application No. 1404996.9, filed Mar. 20, 2014, the contents of each of which are hereby incorporated by reference in their entireties.

BACKGROUND OF THE DISCLOSURE

1. Field of the Disclosure

The present invention relates to an apparatus for indicating pest activity and, particularly, but not exclusively, to an apparatus for indicating insect pest activity. Further particularly, the present invention relates to an apparatus for indicating activity of insects of the family Cimicidae (in particular *Cimex lectularius* (commonly known as "bed bugs" and referred to hereinafter using this expression)). Also, the present invention relates to a pest activity reporting system incorporating the apparatus and an activity sensor for use in the apparatus or system.

2. Description of Related Art

Bed bug infestations are becoming an increasingly common problem in many areas of the world. Treatment of such infestations currently relies upon a pest control technician attending sites of reported pest activity, or inspecting sites where pest activity may be likely, and employing a suitable pest control technique to treat the infestation. However, such treatment is reliant upon the skill level of the pest control technician who would look for evidence of bed bug activity, or for the bed bugs themselves. Since bed bugs are parasitic insects which feed on the blood of warm-blooded animals, their excreta typically contains blood. Therefore, evidence of bed bug activity may present itself as, for example, visible excretion "spots".

In providing a pest control service, a contractor is generally required to provide regular service visits to a client's premises in order to inspect for the presence of any pests and to carry out any pest control measures found to be necessary. As an example, a pest control technician might normally visit a client once every four to eight weeks for this purpose although a substantial number of these visits may result in no further pest control measures being required.

In the event that evidence of pest activity is discovered during the interval between service visits, a client may have the option to request an additional visit from a pest control technician in order to address the problem. However, especially in premises which are not continually inspected, a pest could conceivably be at large and undetected for some time between routine visits. This may have drawbacks because even a relatively temporal incidence of pest infestation may have the potential of causing severe problems such as the spreading of disease or otherwise damaging the client's business. Furthermore, even in premises where inspections are frequent, monitoring of pest activity is reliant upon manual interpretation of evidence of bed bug activity or observance of bed bugs themselves. If either of these things goes unnoticed, whether simply through being overlooked by the pest control technician or being missed through inexperience of the pest control technician, then the infestation could potentially continue untreated for some time.

Bed bug traps exist which take advantage of an aspect of bed bug physiology which allows them to climb textured surfaces, but prevents them from climbing smooth surfaces. These types of trap are generally of a form comprising an access region and an entrapment region. The access region comprises a surface which is sufficiently textured so that a bed bug can climb the surface. This facilitates access to the trap for the bed bug. However, a surface surrounding the entrapment region is generally sufficiently smooth so that a bed bug, having accessed the entrapment region, cannot climb the surface and becomes trapped in the entrapment region.

Bed bug traps of this type may be useful in preventing bed bugs from reaching potential hosts. Also, by trapping bed bugs using such traps, observance of bed beg activity may be improved because the traps may provide a focal point for a technician during inspection of premises. However, traps of this type often are not preferred by businesses due to the fact that bed bugs may be visible within the trap. This may be particularly relevant where the business is a hotel, and where any visible signs of bed bugs themselves may be off-putting to hotel guests.

It will be appreciated that there may be a delay between disappearance of a pest infestation and removal of the traps by a pest control technician from a location where they were laid to combat the infestation. For businesses in the hotel industry, the presence of pest traps in hotel rooms may be off-putting for guests, even if such traps are empty, an infestation has disappeared, and the traps are simply awaiting removal. Also, should the pest infestation return to a location, there may be a delay between noticing, by business staff or customers, that the pest infestation has returned and the arrival of a technician at that location to treat the infestation.

Whilst the above-described pest traps and methods of pest control may have been satisfactory and may continue to be satisfactory for certain situations, the applicant has recognised that it may be desirable to reduce a time delay between commencement of a pest infestation or pest activity and treatment of the pest infestation or activity. Furthermore, the applicant has recognised that it may be desirable to provide an indication of pest infestation or activity which reduces the reliance on manual interpretation of signs of a potential pest infestation problem. Also, the applicant has recognised that it may be desirable to provide an indication of pest infestation or activity which could be effective in short-term incidences of pest infestation in which activity does not persist for any great length of time and which activity may go unnoticed due to the time period between inspections by a pest control technician.

Aspects and embodiments of the present invention have been devised with the foregoing considerations in mind.

SUMMARY OF THE DISCLOSURE

According to an aspect of the present invention, there is provided an apparatus for indicating pest activity, comprising: an activity indicator; an activity sensor, comprising: a substrate comprising a material which is attractive to a target pest species; a sensing element formed on and/or within said substrate, said sensing element configured for coupling to a power source and said activity indicator, and arranged to output a signal to said activity indicator; wherein said signal is influenced by pest activity on and/or within said substrate and said activity indicator is operative to indicate a state of said signal received from said sensing element; and further wherein said state of said signal changes responsive to a change in at least one property of said sensing element caused by deposit of a pest excretion thereon.

The apparatus can provide an observable output indicative of pest activity in an environment where the apparatus is located. In particular, if pest activity occurs on or within the activity sensor of the apparatus, the apparatus is operative to produce an observable output to indicate that pest activity is occurring or has occurred.

By providing an attractant in or on the activity sensor, this may encourage a target pest species to spend a period of time on or within the activity sensor. If this period of time is sufficiently long, then the apparatus may be triggered by such activity.

By providing an observable output indicative of pest activity, the reliance upon a pest control technician observing overt pest activity or upon a skill-level of a pest control technician may be reduced.

Optionally, the material may comprise a harbourage material for providing a harbourage for the target pest species.

By providing a suitable harbourage material, e.g. a fibrous material comprising cardboard, wood and/or textile, as the substrate of the activity sensor, this may encourage a target pest species to use the activity sensor as a harbourage and remain on or within the activity sensor for a period of time sufficient for the apparatus to be triggered by such activity.

Optionally, the sensing element may comprise an electrical current carrying element arranged to carry electrical current provided by a power source.

Optionally, a pulsed electrical current may be provided to the sensing element.

Optionally, the at least one property of the sensing element may comprise an electrical property. For example, pest activity on the sensing element may cause a change in: the resistivity/conductivity of the sensing element; or the reactance/susceptance of the sensing element; or the impedance/admittance of the sensing element; dielectric constant of the sensing element. Indeed, electrolytes in a pest excretion deposited on the sensing element may serve to form a conductive path in the sensing element while the pest excretion spot is still wet. Thus, the resistivity/conductivity, the reactance/susceptance, the impedance/admittance, the capacitance or inductance of the sensing element may be influenced by deposit of pest excreta on the sensing element.

Optionally, a first portion of the electrical current carrying element may be coupled to a power source and a second portion of the electrical current carrying element may be coupled to the activity indicator. Further optionally, the first portion may comprise a plurality of branch conductive elements and the second portion may comprise a plurality of branch conductive elements, further wherein the plurality of branch conductive elements of the first portion and the plurality of branch conductive elements of the second portion may be interleaved to form an alternating arrangement of branch conductive elements of the first portion and branch conductive elements of the second portion. Yet further optionally, spacings between branch conductive elements of the first portion and adjacent branch conductive elements of the second portion may be less than 1 mm, or still further optionally less than 0.5 mm. By using a spacing of this size between a branch conductive element of the first portion and adjacent branch conductive elements of the second portion it may be ensured that, when a target pest species excretes on the activity sensor, the excretion spot bridges a gap between a branch conductive element of the first portion and a branch conductive element of the second portion. Other spacing dimensions may be employed dependent upon the target pest species.

Optionally, the electrical current carrying element may comprise an electrically conductive track formed on and/or within the substrate. The electrically conductive track may comprise a conductive ink printed on the substrate. The conductive track may be formed by printing a conductive ink onto the substrate using, for example, a standard conductive ink deposition process. By printing the conductive ink onto the substrate, elaborate patterns for the sensing element may be formed on materials that are known to be suitable for use in pest harbourages.

Optionally, the electrical current carrying element may comprise, or may further comprise, a wire formed of electrically conductive material located on and/or within the substrate.

Optionally, the apparatus may further comprise a transmitter operative to transmit a signal indicative of a state of the signal output by the activity sensor.

According to another aspect of the present invention, there is provided a pest activity reporting system comprising: an apparatus including any one or more of the above-described features and particularly including a transmitter operative to transmit a signal indicative of a state of the signal output by the activity sensor; a receiver device located at a location remote from the detector; a communications system arranged to convey the signal indicative of a state of the signal output by the activity sensor from the transmitter to the receiver device; and a user interface coupled to the receiver device and arranged to receive from the receiver device the signal indicative of a state of the signal output by the activity sensor, wherein the user interface is operative to provide a visual and/or audible indication of the state of the signal output by the activity sensor.

According to another aspect of the present invention, there is provided an activity sensor for an apparatus comprising any one or more of the features described above, or a pest activity reporting system as described above, the activity sensor comprising: a substrate comprising a material which is attractive to a target pest species; and a sensing element formed on and/or within said substrate, said sensing element configured for coupling to a power source and an activity indicator, and arranged to output a signal to said activity indicator; wherein said state of said signal changes responsive to a change in at least one property of said sensing element caused by deposit of a pest excretion thereon.

BRIEF DESCRIPTION OF THE DRAWINGS

One or more embodiments of the present invention are described further hereinafter, by way of example only, with reference to the accompanying drawings in which.

DETAILED DESCRIPTION OF THE DISCLOSURE

Figure 1:
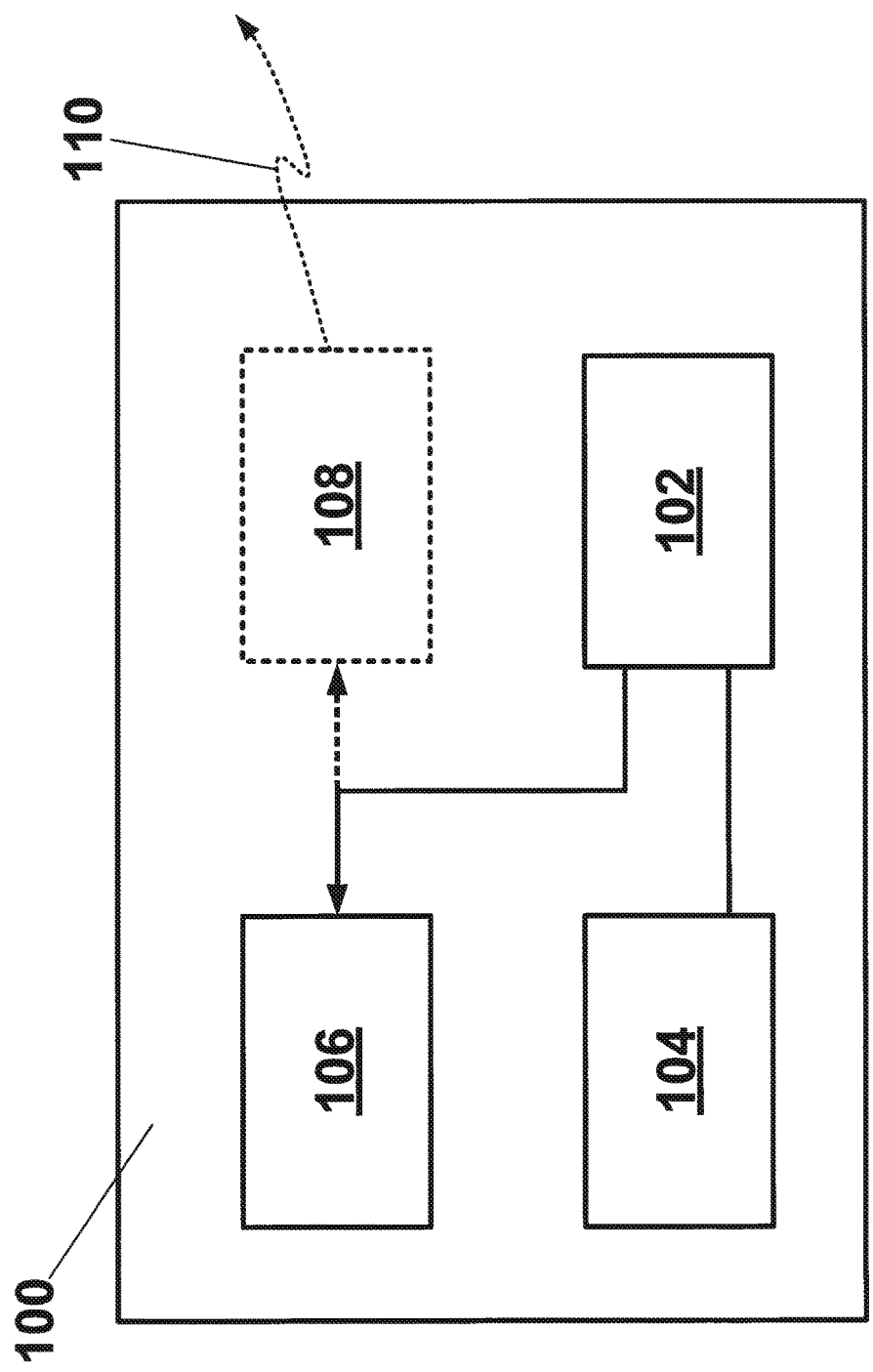
FIG. 1 illustrates a schematic view of an apparatus for indicating pest activity according to one or more embodiments of the present invention.

Referring now to FIG. 1, there is illustrated an apparatus 100 for indicating pest activity. The apparatus 100 comprises an activity sensor 102, a power source 104, and an activity indicator 106. The activity sensor 102 is coupled to both the power source 104 and the activity indicator 106.

The apparatus 100 is suitable for location in environments where pest activity (e.g. bed bug activity) may be likely.

The activity sensor 102 is arranged to output a signal to the activity indicator 106. The signal output by the activity sensor 102 is influenced by pest activity on and/or within the activity sensor 102. The activity indicator 106 is arranged to output a visible and/or audible alert responsive to a change in the output signal received from the activity sensor 102.

For example, when the apparatus 100 is initially placed in an environment, the apparatus 100 may be set to an untriggered state. Upon occurrence of pest activity on and/or within the activity sensor 102, the signal output by the activity sensor 102 will change due to the influence of the pest activity on and/or within the activity sensor 102. For example, the state of the signal may change from: digital-logic 0 to digital-logic 1, or vice versa; from a voltage level below a threshold voltage to a voltage above the threshold voltage, or vice versa; or from a level indicative of a parameter level below a threshold parameter level to a level indicative of a parameter level above a threshold parameter level, or vice versa. This pest activity "triggers" the apparatus 100 and the change in the signal output by the activity sensor 102 is indicated by a change of a visible and/or audible output of the activity indicator 106. This indication may be implemented by, for example, an LED (or other light emitting device) switching from an off-state to an on-state (i.e. a non-illuminated slate to an illuminated state) and/or an alarm unit sounding an alarm upon switching from an off-state to an on-state. Of course, other means for indicating a change in the signal output by the activity sensor 102 will be evident to the person skilled in the art and may be employed in optional arrangements.

Also illustrated in FIG. 1 is an optional feature 108 (denoted by the dotted box). This comprises a transmitter which is coupled to the activity sensor 102 and which is operative to transmit a signal 110 representative of a state of the signal output by the activity sensor 102 to a remote location (e.g. a monitoring station). This feature and the monitoring station will be described in more detail later in relation to FIG. 4.

An example of one or more embodiments of the present invention will be described further with reference to FIGS. 2 and 3, in addition to FIG. 1.

In the illustrated example, the power source 104 comprises a battery and the alert indicator 106 comprises an LED.

Activity sensor 102 comprises a substrate 112 and a sensing element 114 formed on and/or within the substrate 112. The sensing element 114 comprises an electrical current carrying element (e.g. conductive wire or a conductive track) and is formed of two portions 114a, 114b.

Substrate 112 is formed from and/or may comprise a material which is attractive to a target pest species. In one or more embodiments of the present invention, material forming the substrate 112 is impregnated with a biological agent which serves as an attractant to a target pest species. Such a biological agent may be, for an example, a pheromone. In other one or more embodiments, the material forming the substrate 112 itself is attractive to a target pest species. The material comprises a harbourage material for providing a harbourage for the target pest species. In yet other one or more embodiments, the substrate 112 comprises a combination of the above features, i.e. a harbourage material impregnated with a biological agent.

In the field of pest control, a harbourage is known as an area or location within an environment where the pests can seek refuge or shelter (i.e. a living space for the pests which provides suitable conditions).

In the particular case of bed bugs, these pests are known to avoid polished or smooth surfaces, e.g. metals, plastics and glass, and they generally prefer rougher surfaces which offer them a greater degree of traction, e.g. fibrous materials, such as textiles, wood, paper or cardboard. Indeed, suitable types of harbourage for bed bugs may comprise, for example, clothing and bed linen.

With these foregoing considerations in mind, the applicant has recognised that a suitable harbourage material for the substrate 112 of the other one or more embodiments referred to above may be a cardboard sheet, in particular a corrugated cardboard sheet. This may be particularly suitable for an activity sensor 102 having the conductive track as the sensing element 114. The cardboard sheet forming the substrate 112 may offer sufficient stiffness to allow the conductive track to be formed on the substrate 112. Further, the surface of the cardboard sheet is relatively rough and this may serve to attract bed bugs and entice them to traverse the surface (and the sensing element 114 formed thereon).

An end of a first portion 114a of sensing element 114 is coupled to the activity indicator 106 and an end of a second portion 114b of sensing element 114 is coupled to the activity indicator 106.

Each of the first and second portions 114a, 114b comprises a main portion and a plurality of branch conductive elements extending therefrom across the surface of the substrate 112. The plurality of branch conductive elements of the first portion 114a extend in a first direction across the surface of the substrate 112 and the plurality of branch conductive elements of the second portion 114b extend in a second, opposite, direction across the surface of the substrate 112. As can be seen from FIGS. 2 and 3, the plurality of branch conductive elements of the first portion 114a are interleaved with those of the second portion 114b to form an alternating arrangement of branch conductive elements of the first portion 114a and branch conductive elements of the second portion 114b.

Figure 2:
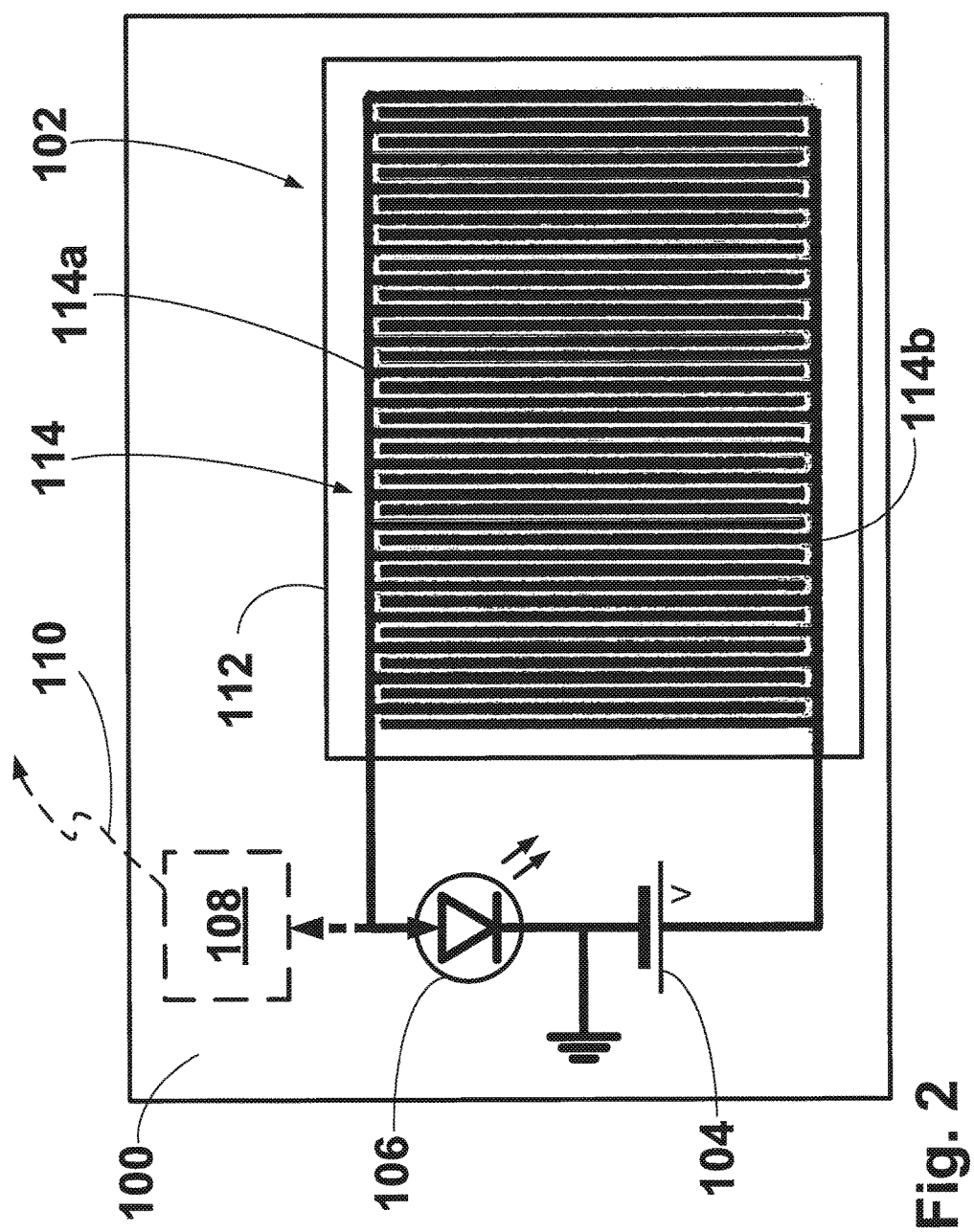
FIG. 2 illustrates a schematic view of elements of the apparatus of FIG. 1 according to one or more embodiments of the present invention with the apparatus in an untriggered state.

In FIG. 2, the apparatus 100 is illustrated in an untriggered state. In this state, there is no electrical connection between the branch conductive elements of the first portion 114a and branch conductive elements of the second portion 114b (i.e. an open circuit) and the alert indicator 106 is in an unlit state.

In one or more embodiments, spacings between branch conductive elements of the first portion 114a and adjacent branch conductive elements of the second portion 114b typically may be less than 1 mm. The spacing between a branch conductive element of the first portion 114a and adjacent branch conductive elements of the second portion 114b is chosen to be of a slightly smaller size than half a typical excretion spot-size of a pest species being targeted. This is to ensure that, when a target pest species excretes on the activity sensor 102, the excretion spot bridges a gap between a branch conductive element of the first portion 114a and a branch conductive element of the second portion 114b. Since the excreta will contain electrolytes, the excretion spot will, when not dry, form a conductive bridge between one or more branch conductive elements of the first portion 114a and one or more branch conductive elements of the second portion 114b. Bed bugs are known to feed upon the blood of a host and so their excreta will be blood-based (i.e. contain electrolytes).

Figure 3:
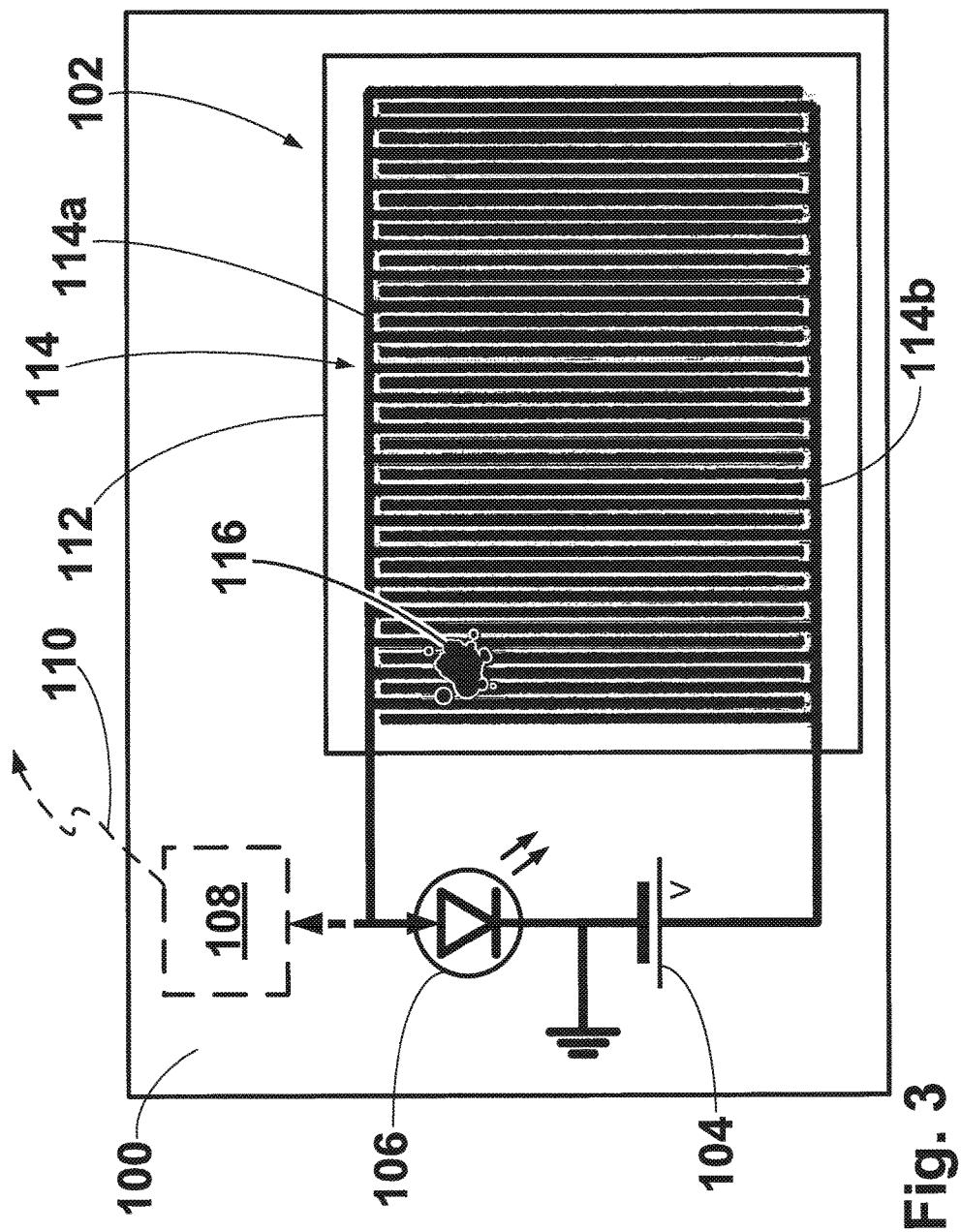
FIG. 3 illustrates a schematic view of elements of the apparatus of FIG. 1 according to one or more embodiments of the present invention with the apparatus in a triggered state.

FIG. 3 illustrates the apparatus 100 in a triggered state. The deposit of an excretion (excretion spot 116) on the sensing element 114 of the activity sensor 102 will temporarily, before the excretion spot 116 dries, form an electrically conductive bridge between one or more branch conductive elements of the first portion 114a and one or more branch conductive elements of the second portion 114b. During this time, an electrical connection is formed between the branch conductive elements of the first portion 114a and branch conductive elements of the second portion 114b. This allows electrical current to flow from the power source 104, through the second portion 114b, through the wet excretion spot 116, through the first portion 114a to the alert indicator 106 and cause the LED of the alert indicator 106 to illuminate. Optionally, this occurrence of current flow may be communicated to a remote location (e.g. at a pest control contractor premises) by way of signal 110 emitted by transmitter 108. In this optional arrangement, a pest control contractor may be alerted to pest activity and may take appropriate action in response.

The excretion spot effectively causes a change in conductivity of the sensing element by temporarily transforming the branch conductive elements of the first portion 114a and branch conductive elements of the second portion 114b from an effectively open circuit configuration (or a relatively high impedance) to an effectively closed circuit configuration (or a relatively low impedance), thereby allowing current to flow.

Figure 4:
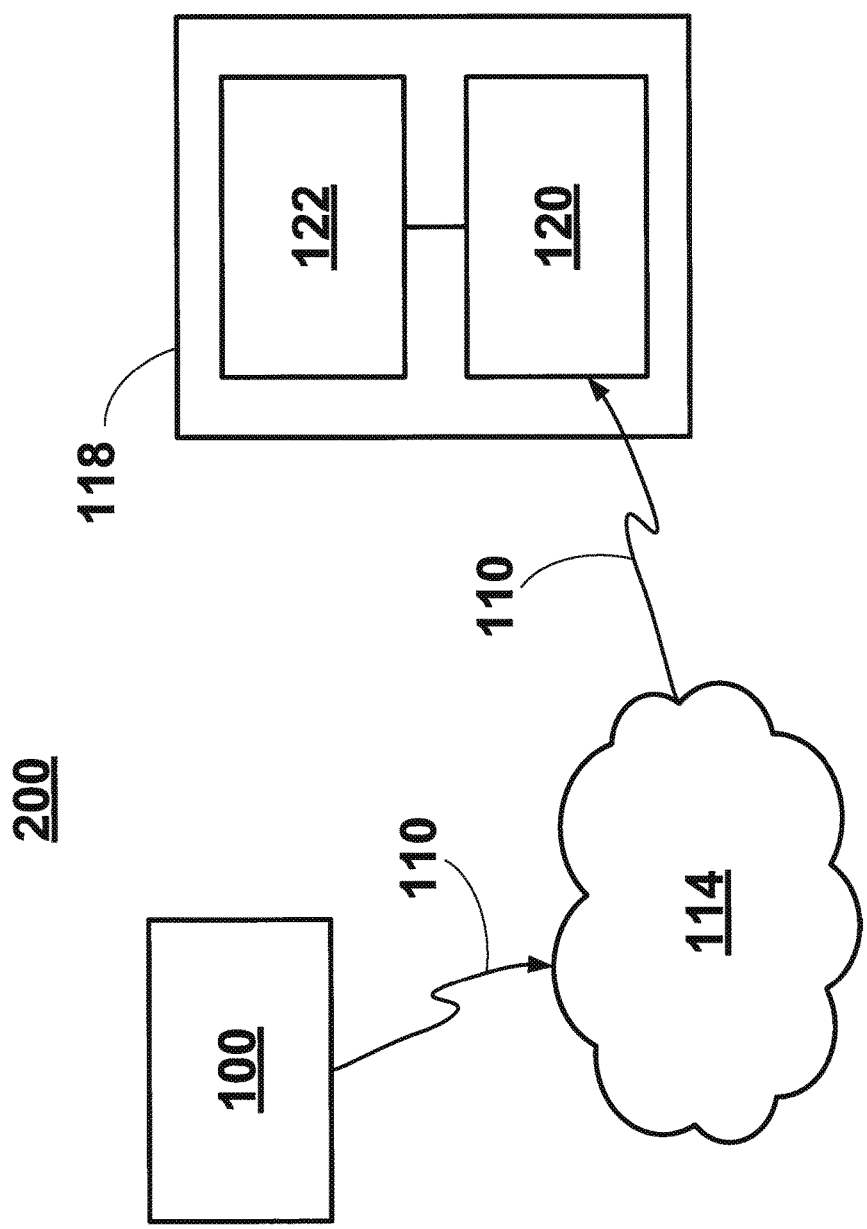
FIG. 4 illustrates a schematic view of pest activity reporting system comprising the apparatus of FIG. 1 according to one or more embodiments of the present invention.

FIG. 4 illustrates a schematic view of a pest activity reporting system 200 comprising the apparatus as described above according to one or more embodiments of the present invention. The apparatus 100 is operative to communicate a signal 110 indicating a state of the apparatus (i.e. triggered or untriggered) via a communications network 114 to a monitoring station 118. The signal 110 is transmitted from the transmitter 108 of the apparatus 100 via the communications network 114 for receipt by a receiving device 120 of the monitoring station 118. Upon receiving the signal 110, the receiving device 120 communicates the signal to a user interface 122 of the monitoring station 118. The user interface is configured to provide a visual and/or audible indication of the state of the signal output by the activity sensor of apparatus 100, and thus provide an indication of whether or not the apparatus 100 has been triggered.

The monitoring station 118 may be located at, for example, a pest control contractor premises. Thus, the transmission of the signal 110 to the monitoring station 118 may provide a means for relaying information regarding the status of the apparatus 100 to a pest control contractor who, responsive to the information received, can take steps to address a potential pest infestation as appropriate.

In an optional arrangement, the harbourage material forming substrate 112 may comprise a textile material and the sensing element 114 may comprise a conductive wire woven into the fabric of the textile material.

In an optional arrangement, spacings between branch conductive elements of the first portion 114a and adjacent branch conductive elements of the second portion 114b typically may be less than 0.5 mm.

In an optional arrangement, the apparatus 100 may further comprise a latch circuit to maintain the LED of the alert indicator 106 in an illuminated state even after the excretion spot has dried. Therefore, a pest control technician inspecting the apparatus 100 at some time after a triggering event can determine that pest activity has occurred (by observing the illuminated LED) and take appropriate action.

It will be understood by those skilled in the art that the drawings are merely diagrammatic and that further items of equipment such as a processor, memory, reset switch and the like may be required in a commercial apparatus. The position of such ancillary items of equipment forms no part of the present invention and is in accordance with conventional practice in the art.

In an optional arrangement, the conductive track may be formed by printing a conductive ink onto the substrate 112 using, for example, a standard conductive ink deposition process. By printing the conductive ink onto the substrate, elaborate patterns for the sensing element may be formed on materials that are known to be suitable for use in pest harbourages.

In one or more embodiments described above, the apparatus 100 is sensitive to changes in the conductivity/resistivity of the sensing element due to deposit of pest excreta thereon. In an optional arrangement, a signal provided to the sensing element may be pulsed. In such an optional arrangement, the apparatus 100 may be sensitive to changes in the susceptance/reactance of the sensing element due to deposit of pest excreta thereon. In another optional arrangement, the apparatus 100 may be configured to be sensitive to changes in admittance/impedance of the sensing element due to deposit of pest excreta thereon.

In an optional arrangement, an on-board power source 104 of the apparatus may be replaced by or supplemented by an external power source.

In an optional arrangement in which a change in capacitance of the sensing element is indicative of pest activity, the apparatus may further comprise a tuned circuit, the frequency of which would change (and thus be detectable) upon the occurrence of pest activity.

In an optional arrangement, the apparatus may further comprise a switch operable by a pest control technician to activate the alert indicator 106. In this optional arrangement, the alert indicator 106 would remain in a deactivated state until the switch is operated by the pest control technician (e.g. the switch is changed from an "off" state to an "on" state) and would return to the deactivated state when the switch is returned to the "off" state.

Such an arrangement may provide for power conservation in the apparatus and may be suitable for arrangements where power is provided by, for example, a battery. Thus, the alert indicator 106, regardless of whether or not the apparatus 100 has been triggered by pest activity, would only produce an output (i.e. indicative of no pest activity or indicative of pest activity) when the switch (e.g. a push-button switch) is operated by an operative.

In an optional arrangement, an LED used as the activity indicator may, for example, output light continuously (e.g. a solid signal) when the apparatus 100 is in an untriggered state and output light discontinuously (e.g. a flashing signal) when the apparatus 100 is in a triggered state.

In an optional arrangement, the apparatus 100 may include a processor which is operative to perform a "moving average" function to dynamically alter a threshold parameter level (against which a measured parameter level is compared when determining if pest activity has occurred or not) to account for ambient conditions in an environment where the apparatus 100 located.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention.

What is claimed is:

1. An apparatus for indicating pest activity, comprising:
   an activity indicator; and
   an activity sensor comprising:
      a substrate comprising a material which is attractive to a target pest species; and
      a sensing element formed on and/or within said substrate, said sensing element configured for coupling to a power source and said activity indicator, and arranged to output an activity signal to said activity indicator,
   wherein said activity signal is influenced by pest activity on and/or within said substrate and said activity indicator is operative to indicate a state of said activity signal received from said sensing element, and
   wherein said state of said activity signal changes responsive to a change in at least one electrical property of said sensing element caused by deposit of an electrolyte-carrying pest excretion on the sensing element.

2. The apparatus according to claim 1, wherein said material comprises a harbourage material for providing a harbourage for said target pest species.

3. The apparatus according to claim 2, wherein said harbourage material comprises a fibrous material.

4. The apparatus according to claim 2, wherein said harbourage material is selected from the group consisting of cardboard, wood, textile, and any combinations thereof.

5. The apparatus according to claim 1, wherein said sensing element comprises an electrical current carrying element arranged to carry electrical current provided by a power source.

6. The apparatus according to claim 5, wherein the electric current is a pulsed electrical current that is provided to said sensing element.

7. The apparatus according to claim 5, wherein said electrical current carrying element has a first portion that is configured for coupling to said power source and a second portion of said electrical current carrying element is coupled to said activity indicator.

8. The apparatus according to claim 7, wherein said first portion comprises a plurality of branch conductive elements and said second portion comprises a plurality of branch conductive elements, and wherein said plurality of branch conductive elements of said first portion and said plurality of branch conductive elements of said second portion are interleaved to form an alternating arrangement of said branch conductive elements of said first portion and said branch conductive elements of said second portion.

9. The apparatus according to claim 8, further comprising spacings between said branch conductive elements of said first portion and adjacently positioned said branch conductive elements of said second portion that are less than 1 mm.

10. The apparatus according to claim 9, wherein said spacings are less than 0.5 mm.

11. The apparatus according to claim 5, wherein said electrical current carrying element comprises an electrically conductive track formed on or within said substrate.

12. The apparatus according to claim 11, wherein said electrically conductive track comprises a conductive ink printed on said substrate.

13. The apparatus according to claim 5, wherein said electrical current carrying element comprises a wire formed of electrically conductive material located on and/or within said substrate.

14. The apparatus according to claim 1, further comprising a transmitter operative to transmit a status signal indicative of said state of said activity signal output by said activity sensor.

15. A pest activity reporting system comprising:
   an apparatus according to claim 14;
   a receiver device located at a location remote from a detector;
   a communications system arranged to convey said status signal indicative of said state of said activity signal output by said activity sensor from said transmitter to said receiver device; and
   a user interface coupled to said receiver device and arranged to receive from said receiver device said status signal indicative of said state of said activity signal output by said activity sensor, wherein said user interface is operative to provide a visual and/or audible indication of said state of said activity signal output by said activity sensor.

16. An activity sensor configured for use with an apparatus for indicating pest activity, said activity sensor comprising:
   a substrate comprising a material which is attractive to a target pest species; and
   a sensing element formed on and/or within said substrate, said sensing element configured for coupling to a power source and an activity indicator, and arranged to output an activity signal to said activity indicator,
   wherein said state of said activity signal changes responsive to a change in at least one electrical property of said sensing element caused by deposit of an electrolyte-carrying pest excretion on the sensing element.

17. The activity sensor according to claim 16, wherein said material comprises a harbourage material for providing a harbourage for said target pest species.

18. The activity sensor according to claim 17, wherein said harbourage material comprises a fibrous material.

19. The activity sensor according to claim 17, wherein said harbourage material is selected from the group consisting of cardboard, wood, textile, and any combinations thereof.

20. The activity sensor according to claim 16, wherein said sensing element comprises an electrical current carrying element arranged to carry electrical current provided by said power source.

21. The activity sensor according to claim 20, wherein said electrical current carrying element has a first portion that is configured for coupling to said power source and a second portion of said electrical current carrying element is configured for coupling to said activity indicator.

22. The activity sensor according to claim 21, wherein said first portion comprises a plurality of branch conductive elements and said second portion comprises a plurality of branch conductive elements, and wherein said plurality of branch conductive elements of said first portion and said plurality of branch conductive elements of said second portion are interleaved to form an alternating arrangement of said branch conductive elements of said first portion and said branch conductive elements of said second portion.

23. The activity sensor according to claim 22, further comprising spacings between said branch conductive elements of said first portion and adjacently positioned said branch conductive elements of said second portion that are less than 1 mm.

24. The activity sensor according to claim 23, wherein said spacings are less than 0.5 mm.

25. The activity sensor according to claim 20, wherein said electrical current carrying element comprises an electrically conductive track formed on said substrate.

26. The activity sensor according to claim 25, wherein said electrically conductive track comprises a conductive ink printed on said substrate.

27. The activity sensor according to claim 20, wherein said electrical current carrying element comprises a wire formed of electrically conductive material located within said substrate.

* * * * *